United States Patent
Harada

(10) Patent No.: US 11,130,234 B2
(45) Date of Patent: Sep. 28, 2021

(54) ROBOT AND COLLISION DETECTION METHOD THEREFOR

(71) Applicant: Fanuc Corporation, Yamanashi (JP)

(72) Inventor: Shizuo Harada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 374 days.

(21) Appl. No.: 16/196,598

(22) Filed: Nov. 20, 2018

(65) Prior Publication Data

US 2019/0160676 A1    May 30, 2019

(30) Foreign Application Priority Data

Nov. 28, 2017  (JP) .............................. JP2017-228037

(51) Int. Cl.
| | |
|---|---|
| *G05B 19/04* | (2006.01) |
| *B25J 9/16* | (2006.01) |

(52) U.S. Cl.
CPC ........... *B25J 9/1666* (2013.01); *B25J 9/1633* (2013.01); *B25J 9/1694* (2013.01)

(58) Field of Classification Search
CPC ...... B25J 9/1666; B25J 9/1694; B25J 9/1633; B25J 9/1676; B25J 9/1692; B25J 9/20; G05B 2219/37624; G05B 2219/41304; G05B 2219/39355
See application file for complete search history.

(56) References Cited

U.S. PATENT DOCUMENTS

| | | | |
|---|---|---|---|
| 6,408,225 B1 | 6/2002 | Ortmeier et al. | |
| 2010/0212305 A1* | 8/2010 | Runesson | B25J 19/0012 60/327 |
| 2014/0297032 A1 | 10/2014 | Hayashi | |
| 2014/0297037 A1* | 10/2014 | Hayashi | B25J 9/1694 700/258 |

(Continued)

FOREIGN PATENT DOCUMENTS

| | | |
|---|---|---|
| EP | 3427908 A1 | 1/2019 |
| JP | H04-019093 A | 1/1992 |
| JP | H04-242406 A | 8/1992 |

(Continued)

OTHER PUBLICATIONS

Usui, Takumi; Notice of Reasons for Refusal for Japanese Patent Application No. 2017-228037; dated Oct. 29, 2019; 4 pages.

*Primary Examiner* — Harry Y Oh
(74) *Attorney, Agent, or Firm* — Shackelford, Bowen, McKinely & Norton, LLP

(57) ABSTRACT

Provided is a robot including: a robot body that is provided with at least one arm; a gas spring that functions as a balancer for the arm of the robot body; an internal-pressure detecting unit that detects a cylinder internal pressure of the gas spring; and a control device that controls the robot body. The control device calculates, as an estimated disturbance value, the difference between a torque command value for a servomotor that drives the arm and a torque of the servomotor that is required to actually operate the arm, determines that the robot body has had a collision when the estimated disturbance value exceeds a predetermined threshold, and corrects the estimated disturbance value or the threshold on the basis of the cylinder internal pressure detected by the internal-pressure detecting unit.

5 Claims, 4 Drawing Sheets

(56) References Cited

U.S. PATENT DOCUMENTS

2016/0288326 A1 10/2016 Furuya
2020/0164529 A1* 5/2020 Kitamura ............. B25J 19/0012

FOREIGN PATENT DOCUMENTS

| | | | | |
|---|---|---|---|---|
| JP | H09-229009 A | | 9/1997 | |
| JP | H11282540 | * | 10/1998 | ............ B25J 9/1676 |
| JP | H11-015511 A | | 1/1999 | |
| JP | H11-070490 A | | 3/1999 | |
| JP | H11-282540 A | | 10/1999 | |
| JP | 2001-051721 A | | 2/2001 | |
| JP | 2012519083 A | * | 8/2012 | |
| JP | 2013-169609 A | | 9/2013 | |
| JP | 2013169609 A | * | 9/2013 | |
| JP | 2014-193516 A | | 10/2014 | |
| JP | 2014-195849 A | | 10/2014 | |
| JP | 5612150 B | | 10/2014 | |
| JP | 5612150 B2 | * | 10/2014 | ............ B25J 9/1674 |
| JP | 5628953 B | | 11/2014 | |
| JP | 5628953 B2 | * | 11/2014 | .......... B25J 19/0012 |
| JP | 2016-193463 A | | 11/2016 | |
| JP | 2017-159402 A | | 9/2017 | |

* cited by examiner

ROBOT AND COLLISION DETECTION METHOD THEREFOR

CROSS-REFERENCE TO RELATED APPLICATIONS

This application is based on Japanese Patent Application No. 2017-228037, the contents of which are incorporated herein by reference.

TECHNICAL FIELD

The present invention relates to a robot and a collision detection method therefor.

BACKGROUND ART

In the related art, there is a known robot that is provided with a balancer formed of a gas spring for causing a torque in the direction opposite to the direction of gravity, as a device for assisting the torque of a servomotor for an axis on which a load due to gravity acts (for example, see Publication of Japanese Patent No. 5628953).

Because the gas spring is compact and lightweight compared with a coil spring that can generate the equivalent output, reductions in size and weight of the robot and a reduction in the cost thereof can be achieved.

The robot of Publication of Japanese Patent No. 5628953 detects a reduction in cylinder internal pressure due to gas leakage caused by the motion of a piston rod with respect to a cylinder of the gas spring.

There is a known collision detection method in which an external force due to a collision is calculated on the basis of the torque of a servomotor, and, when the calculated external force is greater than a predetermined threshold, a collision of a robot is detected (for example, see Japanese Unexamined Patent Application, Publication No. 2013-169609).

SUMMARY OF INVENTION

According to one aspect, the present invention provides a robot including: a robot body that is provided with at least one arm; a gas spring that functions as a balancer for the arm of the robot body; an internal-pressure detecting unit that detects a cylinder internal pressure of the gas spring; and a control device that controls the robot body, wherein the control device calculates, as an estimated disturbance value, the difference between a torque command value for a servomotor that drives the arm and a torque of the servomotor that is required to actually operate the arm, determines that the robot body has had a collision when the estimated disturbance value exceeds a predetermined threshold, and corrects the estimated disturbance value or the threshold on the basis of the cylinder internal pressure detected by the internal-pressure detecting unit.

According to another aspect, the present invention provides a robot collision detection method including: an internal-pressure detection step of detecting a cylinder internal pressure of a gas spring that functions as a balancer for at least one arm provided in a robot body; a disturbance calculation step of calculating, as an estimated disturbance value, the difference between a torque command value for a servomotor that drives the arm of the robot body and a torque of the servomotor that is required to actually operate the arm; a correction step of correcting the estimated disturbance value on the basis of the cylinder internal pressure detected in the internal-pressure detection step; and a determination step of determining that the robot body has had a collision when the estimated disturbance value corrected in the correction step exceeds a predetermined threshold.

DESCRIPTION OF THE EMBODIMENTS

A robot 1 and a collision detection method therefor according to one embodiment of the present invention will be described below with reference to the drawings.

Figure 1:
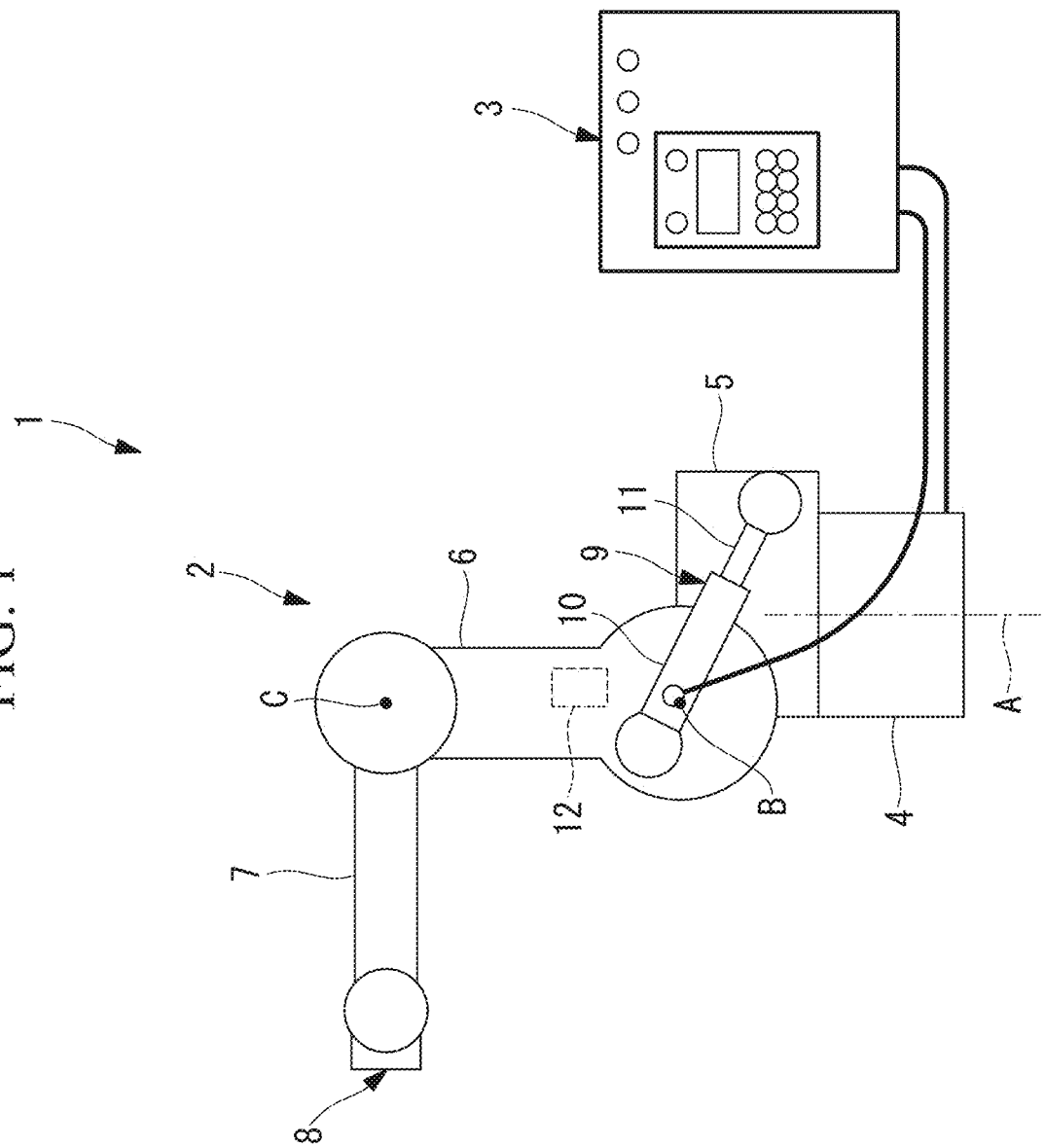
FIG. 1 is a view showing the overall configuration of a robot according to one embodiment of the present invention.

As shown in FIG. 1, the robot 1 of this embodiment is provided with an upright articulated robot body 2 and a control device 3 that controls the robot body 2.

The robot body 2 is provided with: a base 4 that is fixed to an installation target surface (floor surface); a turning part 5 that is supported so as to be rotatable about a vertical first axis A with respect to the base 4; a first arm (arm) 6 that is supported so as to be rotatable about a horizontal second axis B with respect to the turning part 5; a second arm (arm) 7 that is supported at a distal end of the first arm 6 so as to be rotatable about a horizontal third axis C; and a three-axis wrist unit 8 that is supported at a distal end of the second arm 7.

The robot body 2 of this embodiment is provided with a gas spring 9 between the turning part 5 and the first arm 6. The gas spring 9 is provided with: a cylinder 10 that is rotatably supported on the first arm 6; and a piston rod (piston) 11 that is rotatably supported on the turning part 5 and that is made to slide in the cylinder 10 along the longitudinal direction. Inert gas is contained within the cylinder 10.

The gas spring 9 functions as a balancer for reducing the load of a servomotor 12 that drives the first arm 6, on which a large load due to gravity acts.

The control device 3 controls the servomotor 12 for each axis of the robot body 2.

Figure 2:
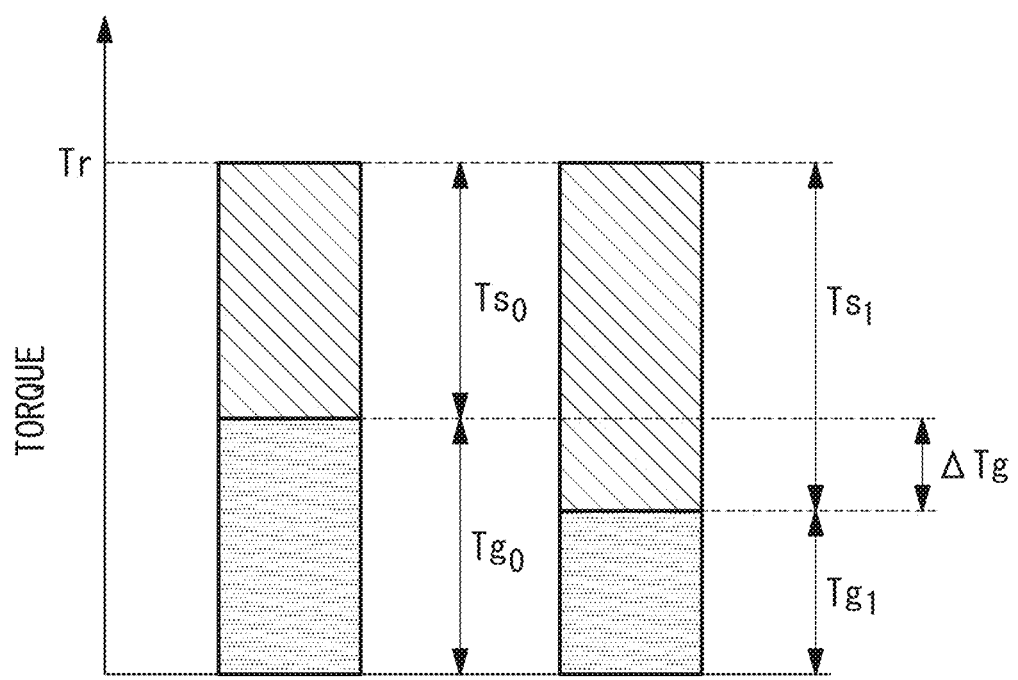
FIG. 2 is a view showing the distribution of torque due to a servomotor and a gas spring in a case in which a proper amount of gas for a torque required for a first arm in the robot shown in FIG. 1 is contained, and the distribution thereof in a case in which the gas leaks.

As shown in FIG. 2, a torque $Ts_0$ due to the servomotor 12 and a torque $Tg_0$ due to the gas spring 9 or a torque $Ts_1$ due to the servomotor 12 and a torque $Tg_1$ due to the gas spring 9 simultaneously act on the first arm 6, thus providing a torque Tr required for operation. In FIG. 2, a torque distribution in a case in which a proper amount of gas is filled in the gas spring 9 is shown at the left side, and a torque distribution in a state in which the gas leaks, thus reducing the cylinder internal pressure of the cylinder 10, is shown at the right side.

As described above, because the gas spring 9 functions as a balancer for the first arm 6, the torque Tr required for driving the first arm 6 is the total of the torque $Ts_0$ due to the servomotor 12 and the torque $Tg_0$ due to the gas spring 9. If the gas leaks, the torque due to the gas spring 9 is reduced to $Tg_1$; thus, in order to obtain the required torque Tr, it is necessary to increase the torque of the servomotor 12 to $Ts_1$.

The torque $Ts_0$, $Ts_1$ of the servomotor 12 can be calculated on the basis of the electrical-current value of the servomotor 12, and the torque $Tg_0$, $Tg_1$ due to the gas spring 9 can be calculated on the basis of the cylinder internal pressure.

The control device 3 calculates, as an estimated disturbance value, the difference between an electrical-current command value supplied to the servomotor 12 for each axis and an actually-detected electrical-current value of the servomotor 12 for the axis and determines that the robot body 2 has collided with an external object when the estimated disturbance value exceeds a predetermined threshold.

Then, according to the robot 1 of this embodiment, a pressure sensor (not shown, internal-pressure detecting unit) that detects the cylinder internal pressure is provided, and the control device 3 functions as a correction unit for correcting the estimated disturbance value or the threshold on the basis of the cylinder internal pressure detected by the pressure sensor.

Specifically, the control device 3 uses, as a reference, the cylinder internal pressure that is detected by the pressure sensor when the first arm 6 is disposed at a predetermined determination position in a state in which the proper amount of gas is contained, and calculates the difference between the reference cylinder internal pressure and the cylinder internal pressure that is detected by the pressure sensor when the first arm 6 is disposed at the same determination position, at the right time after the robot body 2 is operated. Then, the torque corresponding to the difference is calculated as a change $\Delta Tg$ between the torques $Tg_0$ and $Tg_1$ due to the gas spring 9.

Then, the control device 3 subtracts the torque change $\Delta Tg$ due to the gas spring 9 from the calculated estimated disturbance value, thereby correcting the estimated disturbance value, for example, and compares the corrected estimated disturbance value with the threshold, thereby detecting a collision of the robot body 2 with an external object. Alternately, the torque change $\Delta Tg$ is added to a set threshold, and the corrected threshold is compared with the estimated disturbance value, thereby detecting a collision of the robot body 2 with an external object.

The collision detection method for the thus-configured robot 1 of this embodiment will be described below.

Figure 3:
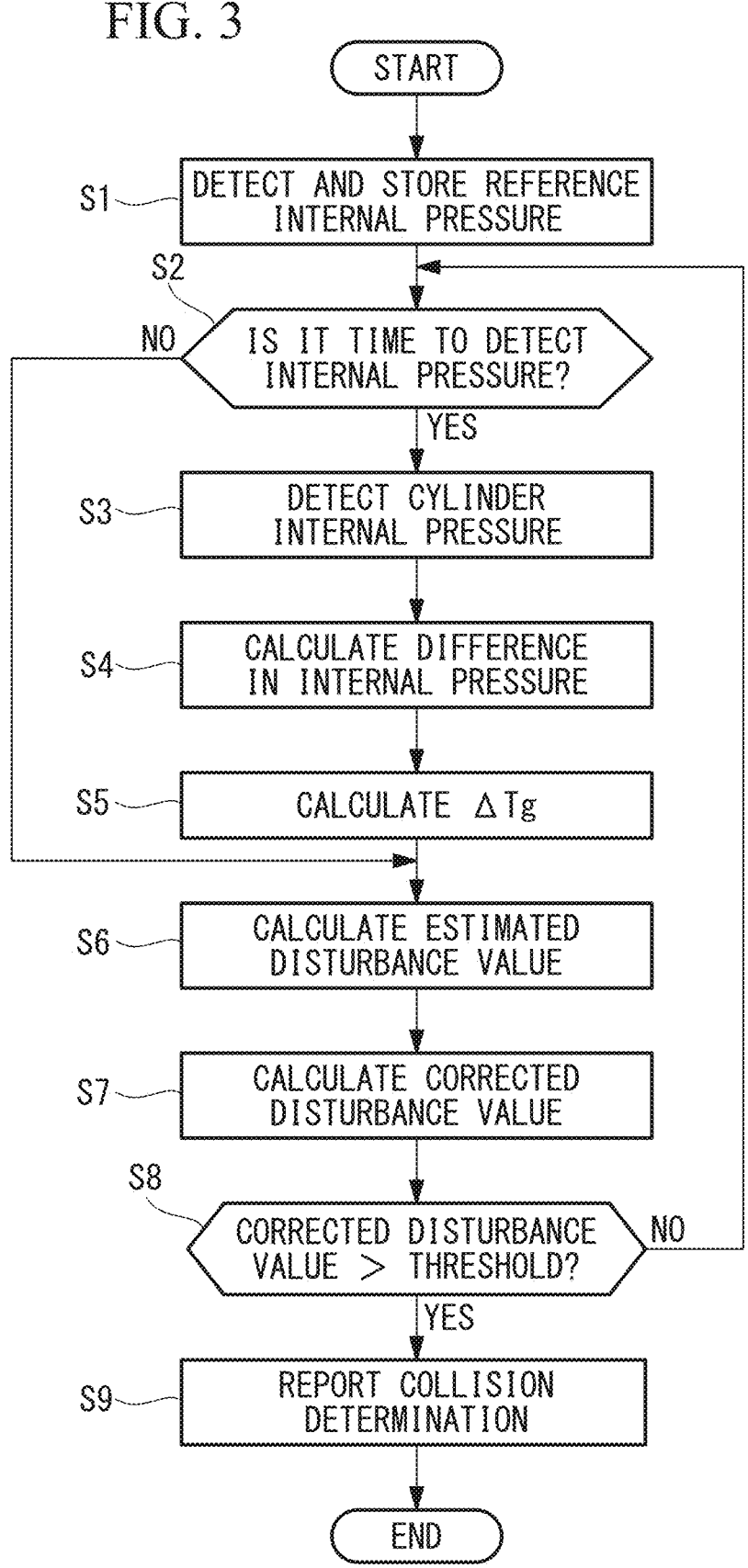
FIG. 3 is a flowchart showing a collision detection method for the robot shown in FIG. 1.

As shown in FIG. 3, in the collision detection method for the robot 1 of this embodiment, in a state in which a proper amount of gas is contained, the first arm 6 is disposed at the predetermined determination position, the cylinder internal pressure is detected by the pressure sensor, and the detected cylinder internal pressure is stored as a reference internal pressure (Step S1).

Thereafter, the robot body 2 is operated, and it is determined whether it is time to detect the cylinder internal pressure (Step S2). If it is time for detection, the cylinder internal pressure is detected by the pressure sensor when the first arm 6 is disposed at the determination position (internal-pressure detection step S3). The difference between the cylinder internal pressure and the reference internal pressure, which are detected at the same determination position, is calculated (Step S4), and the change $\Delta Tg$ between the torques $Tg_0$ and $Tg_1$ due to the gas spring 9 is calculated by using the calculated difference (Step S5).

During the operation of the robot body 2, the estimated disturbance value is calculated on the basis of the difference between the electrical-current command value commanded to the servomotor 12 for each axis and the detected electrical-current value actually flowing in the servomotor 12 (disturbance calculation step S6). The estimated disturbance value changes as indicated by the one-dot chain line in FIG. 4, for example.

Then, an electrical-current change $\Delta Ig$ corresponding to the change $\Delta Tg$ is subtracted from the calculated estimated disturbance value, thus calculating a corrected estimated disturbance value (indicated by the solid line in FIG. 4) (correction step S7).

Thereafter, the corrected estimated disturbance value is compared with the threshold (Step S8). If the corrected estimated disturbance value exceeds the threshold, it is determined that the robot body 2 has collided with an external object (determination step S9), and this determination is reported. If the corrected estimated disturbance value is equal to or less than the threshold, the process steps from Step S2 onward are performed.

If it is determined in Step S2 that it is not time to detect the cylinder internal pressure, the process steps from the disturbance calculation step S6 onward are performed.

Figure 4:
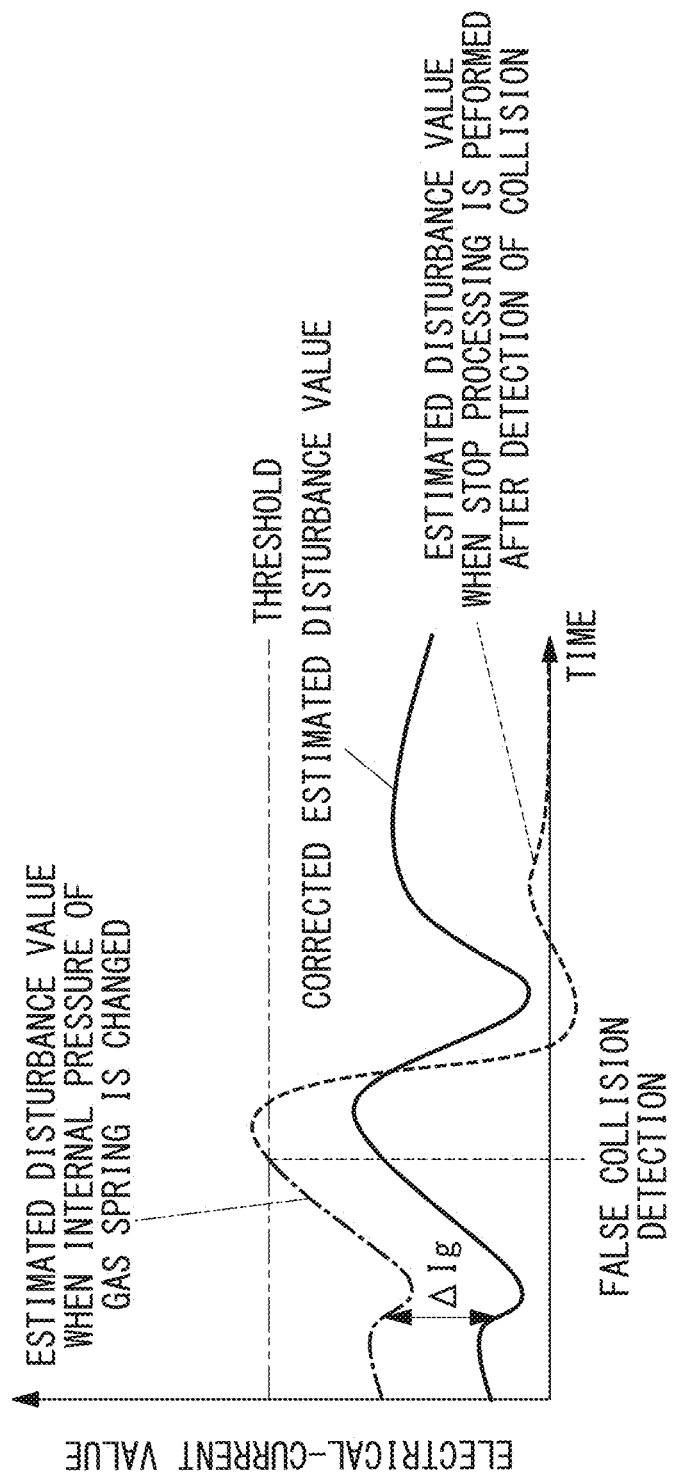
FIG. 4 is a view showing an example case in which an estimated disturbance value changes when the internal pressure of the gas spring of the robot shown in FIG. 1 is reduced.

In this way, according to the robot 1 and the collision detection method therefor of this embodiment, in a case in which a collision of the robot 1 is detected on the basis of the electrical-current value of the servomotor 12, if the cylinder internal pressure of the gas spring 9 is reduced, the calculated estimated disturbance value of the servomotor 12 is increased as indicated by the one-dot chain line; however, because the estimated disturbance value or the threshold is corrected on the basis of the cylinder internal pressure, as indicated by the solid line in FIG. 4, there is an advantage in that false detection of a collision of the robot 1 is prevented, thus making it possible to accurately detect a collision.

In this embodiment, although the pressure sensor for detecting the cylinder internal pressure of the gas spring 9 is shown as the internal-pressure detecting unit, instead of this, it is also possible to store, as a reference value, the electrical-current value of the servomotor 12 when the first arm 6 is disposed at the predetermined determination position in a state in which a proper amount of gas is filled and to estimate the cylinder internal pressure on the basis of the difference between the reference value and the electrical-current value of the servomotor 12 when the first arm 6 is disposed again at the determination position, at the right time after the robot body 2 is operated.

By doing so, it is possible to detect a reduction in the cylinder internal pressure without preparing a pressure sensor.

As the internal-pressure detecting unit, it is also possible to calculate the total operating distance of the piston rod 11 with respect to the cylinder 10 of the gas spring 9 and to estimate the cylinder internal pressure on the basis of the calculated total operating distance.

By doing so, it is possible to easily calculate the total operating distance according to the rotation angle of the first arm 6, without providing a special sensor.

As a result, the following aspect is derived from the above described embodiment.

According to one aspect, the present invention provides a robot including: a robot body that is provided with at least one arm; a gas spring that functions as a balancer for the arm of the robot body; an internal-pressure detecting unit that detects a cylinder internal pressure of the gas spring; and a control device that controls the robot body, wherein the control device calculates, as an estimated disturbance value, the difference between a torque command value for a servomotor that drives the arm and a torque of the servomotor that is required to actually operate the arm, determines that the robot body has had a collision when the estimated disturbance value exceeds a predetermined threshold, and corrects the estimated disturbance value or the threshold on the basis of the cylinder internal pressure detected by the internal-pressure detecting unit.

According to this aspect, the internal-pressure detecting unit detects the cylinder internal pressure of the gas spring, and the control device calculates, as an estimated disturbance value, the difference between a torque command value for the servomotor, which drives the arm, and a torque of the servomotor that is required to actually operate the arm and corrects the calculated estimated disturbance value or the threshold on the basis of the detected cylinder internal pressure. Then, a collision of the robot body is detected by determining whether the estimated disturbance value exceeds the threshold, on the basis of the corrected value.

When the cylinder internal pressure of the gas spring is reduced, an extra torque needs to be generated by the servomotor; thus, the torque of the servomotor that is required to actually operate the arm is increased, and the estimated disturbance value is also increased. However, according to this aspect, the estimated disturbance value or the threshold, with which the estimated disturbance value is compared, is corrected on the basis of the detected cylinder internal pressure, thereby making it possible to prevent false detection of a collision even when a reduction in the cylinder internal pressure of the gas spring occurs and to accurately detect a collision of the robot.

In the above-described aspect, the control device may correct the estimated disturbance value or the threshold by using a torque change based on the difference between the cylinder internal pressure detected by the internal-pressure detecting unit and the cylinder internal pressure in a state in which a proper amount of gas is filled.

By doing so, the estimated disturbance value can be accurately corrected by using a torque change that the servomotor needs to be in charge anew, the change being due to a reduction in the cylinder internal pressure.

In the above-described aspect, the internal-pressure detecting unit may be a pressure sensor provided in the gas spring.

By doing so, a change in the cylinder internal pressure of the gas spring can be directly detected by the pressure sensor.

In the above-described aspect, the internal-pressure detecting unit may use, as a reference value, an electrical-current value of the servomotor when the arm is disposed at a predetermined determination position in a state in which a proper amount of gas is filled, and may estimate the cylinder internal pressure on the basis of the difference between an electrical-current value of the servomotor when the arm is disposed at the determination position and the reference value.

By doing so, the cylinder internal pressure can be easily estimated from the electrical-current value of the servomotor, without using a new sensor.

In the above-described aspect, the internal-pressure detecting unit may accumulate the total operating distance of a piston with respect to a cylinder that constitutes the gas spring and may estimate the cylinder internal pressure on the basis of the accumulated total operating distance.

In a gas spring, it is known that gas contained therein leaks according to the sliding distance of a piston with respect to a cylinder. Thus, the cylinder internal pressure can be easily estimated by calculating the total operating distance.

According to another aspect, the present invention provides a robot collision detection method including: an internal-pressure detection step of detecting a cylinder internal pressure of a gas spring that functions as a balancer for at least one arm provided in a robot body; a disturbance calculation step of calculating, as an estimated disturbance value, the difference between a torque command value for a servomotor that drives the arm of the robot body and a torque of the servomotor that is required to actually operate the arm; a correction step of correcting the estimated disturbance value on the basis of the cylinder internal pressure detected in the internal-pressure detection step; and a determination step of determining that the robot body has had a collision when the estimated disturbance value corrected in the correction step exceeds a predetermined threshold.

REFERENCE SIGNS LIST 1 robot
2 robot body
3 control device
6 first arm (arm)
7 second arm (arm)
9 gas spring
10 cylinder
11 piston rod (piston)
12 servomotor
S3 internal-pressure detection step
S6 disturbance calculation step
S7 correction step
S9 determination step

The invention claimed is:

1. A robot comprising:
a robot body that is provided with at least one arm;
a gas spring that functions as a balancer for the arm of the robot body;
a pressure sensor that detects a cylinder internal pressure of the gas spring; and
a controller that stores a reference internal pressure for the cylinder internal pressure
wherein every time a predetermined time for detecting the cylinder internal pressure of the gas spring arrives, the controller is configured to:
  calculate, as an estimated disturbance value, a difference between a torque command value for a servomotor that drives the arm and a torque of the servomotor that is required to actually operate the arm and calculate a pressure difference between the cylinder internal pressure detected by the pressure sensor and the stored reference internal pressure;
  correct the calculated estimated disturbance value or a predetermined threshold on the basis of the calculated pressure difference; and
  detect a collision of the robot body by comparing the corrected estimated disturbance value with the predetermined threshold or comparing the calculated estimated disturbance value with the corrected predetermined threshold.

2. The robot according to claim 1, wherein the reference internal pressure is the cylinder internal pressure in a state in which a proper amount of gas is filled, and the controller is configured to correct the calculated estimated disturbance value or the predetermined threshold by using a torque change based on the calculated pressure difference.

3. The robot according to claim 1, wherein the pressure sensor uses, as a reference value, an electrical-current value of the servomotor when the arm is disposed at a predetermined determination position in a state in which a proper amount of gas is filled, and estimates the cylinder internal pressure on the basis of the difference between an electrical-current value of the servomotor when the arm is disposed at the determination position and the reference value.

4. The robot according to claim 1, wherein the pressure sensor accumulates the total operating distance of a piston with respect to a cylinder that constitutes the gas spring and estimates the cylinder internal pressure on the basis of the accumulated total operating distance.

5. A robot collision detection method for a robot including a robot body that is provided with at least one arm and a gas spring that functions as a balancer for the arm of the robot body, the method comprising:
- detecting, every time a predetermined time for detecting a cylinder internal pressure of the gas spring arrives, the cylinder internal pressure of the gas spring and
- calculating, as an estimated disturbance value, a difference between a torque command value for a servomotor that drives the arm and a torque of the servomotor that is required to actually operate the arm;
- calculating a pressure difference between the detected cylinder internal pressure and a reference internal pressure for the cylinder internal pressure;
- correcting the calculated estimated disturbance value or a predeterminde threshold on the basis of the calculated pressure difference; and
- detecting a collision of the robot body by comparing the corrected estimated disturbance value with the predetermined threshold or comparing the calculated estimated disturbance value with the corrected predetermined threshold.

* * * * *